US011288176B2

(12) United States Patent
Dhayanithi

(10) Patent No.: US 11,288,176 B2
(45) Date of Patent: *Mar. 29, 2022

(54) EXECUTING INTEGRATION SCENARIO REGRESSION TESTS IN CUSTOMER LANDSCAPES

(71) Applicant: SAP SE, Walldorf (DE)

(72) Inventor: VishnuPrasath Dhayanithi, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/992,923

(22) Filed: Aug. 13, 2020

(65) Prior Publication Data
US 2020/0371905 A1 Nov. 26, 2020

Related U.S. Application Data

(63) Continuation of application No. 16/390,209, filed on Apr. 22, 2019, now Pat. No. 10,776,254.

(51) Int. Cl.
G06F 11/36 (2006.01)
G06Q 30/02 (2012.01)
G06F 8/65 (2018.01)

(52) U.S. Cl.
CPC ............ *G06F 11/3688* (2013.01); *G06F 8/65* (2013.01); *G06F 11/3664* (2013.01);
(Continued)

(58) Field of Classification Search
None
See application file for complete search history.

(56) References Cited

U.S. PATENT DOCUMENTS 10,776,254 B1\* 9/2020 Dhayanithi ........ G06Q 30/0201
2004/0060044 A1\* 3/2004 Das ..................... G06F 11/3672
717/171
(Continued)

OTHER PUBLICATIONS

Larner, "Deploying and testing an enterprise integration in App Connect on IBM Cloud", 2018, IBM (Year: 2018).\*
(Continued)

*Primary Examiner* — Hossain M Morshed
(74) *Attorney, Agent, or Firm* — Fish & Richardson P.C.

(57) ABSTRACT

The present disclosure involves systems, software, and computer implemented methods for executing integration scenario regression tests in customer landscapes. One example method includes identifying a request to create a test case for an integration scenario for a cloud platform customer. The test case is created for the scenario, including enabling the test case to run in an isolated customer environment specific to the customer. An update to the cloud platform is identified. The update is provisionally applied to the cloud platform for the customer. The test case is executed in the isolated customer environment, to test the scenario for the customer. A determination is made as to whether execution of the test case succeeded. In response to determining successful test case execution, the update to the cloud platform is finalized for the customer. In response to determining unsuccessful test case execution, the update is rolled back for the customer.

20 Claims, 11 Drawing Sheets

(52) U.S. Cl.
CPC ...... *G06F 11/3684* (2013.01); *G06F 11/3692* (2013.01); *G06Q 30/0201* (2013.01)

(56) References Cited

U.S. PATENT DOCUMENTS

| | | | | |
|---|---|---|---|---|
| 2012/0209947 | A1* | 8/2012 | Glaser | G06F 9/5027 709/217 |
| 2013/0152047 | A1* | 6/2013 | Moorthi | G06F 11/368 717/124 |
| 2015/0205706 | A1* | 7/2015 | Michelsen | G06F 8/33 717/125 |
| 2016/0092059 | A1* | 3/2016 | Tu | G06F 16/252 715/738 |
| 2018/0060456 | A1* | 3/2018 | Phatak | G06F 9/5027 |
| 2018/0314516 | A1* | 11/2018 | Atzitz | G06F 8/35 |
| 2018/0349254 | A1* | 12/2018 | Hui | G06F 11/3692 |
| 2019/0052551 | A1* | 2/2019 | Barczynski | H04L 67/1008 |
| 2019/0087075 | A1* | 3/2019 | Dhayanithi | G06F 3/04842 |
| 2019/0095320 | A1* | 3/2019 | Biswas | G06F 21/552 |
| 2019/0155721 | A1* | 5/2019 | Reeve | G06F 11/3692 |
| 2019/0354354 | A1* | 11/2019 | Dubinskii | G06F 11/301 |
| 2019/0361801 | A1* | 11/2019 | Roth | G06F 11/3688 |
| 2020/0409970 | A1* | 12/2020 | Dhayanithi | G06F 16/212 |

OTHER PUBLICATIONS

Sotiriadis, "Unit and Integration Testing of Modular Cloud Services", 2017, IEEE 31st International Conference on Advanced Information Networking and Applications (Year: 2017).*

Handy, "How To Do Microservices Integration Testing in the Cloud", 2018, The New Stack (Year: 2018).*

SAP Help Portal [online], "Understanding Integration Flow," SAP NetWeaver 7.3 EHP1; Process Integration Tools (Eclipse-Based) Guide, Version SPS19, Jan. 4, 2017, [retrieved on Apr. 17, 2019], retrieved from: URL<https://help.sap.com/doc/saphelp_nw73ehp1/7.31.19/en-US/76/94c168d14e4baa8a7c3b5dea209ad4/frameset.htm>, 3 pages.

* cited by examiner

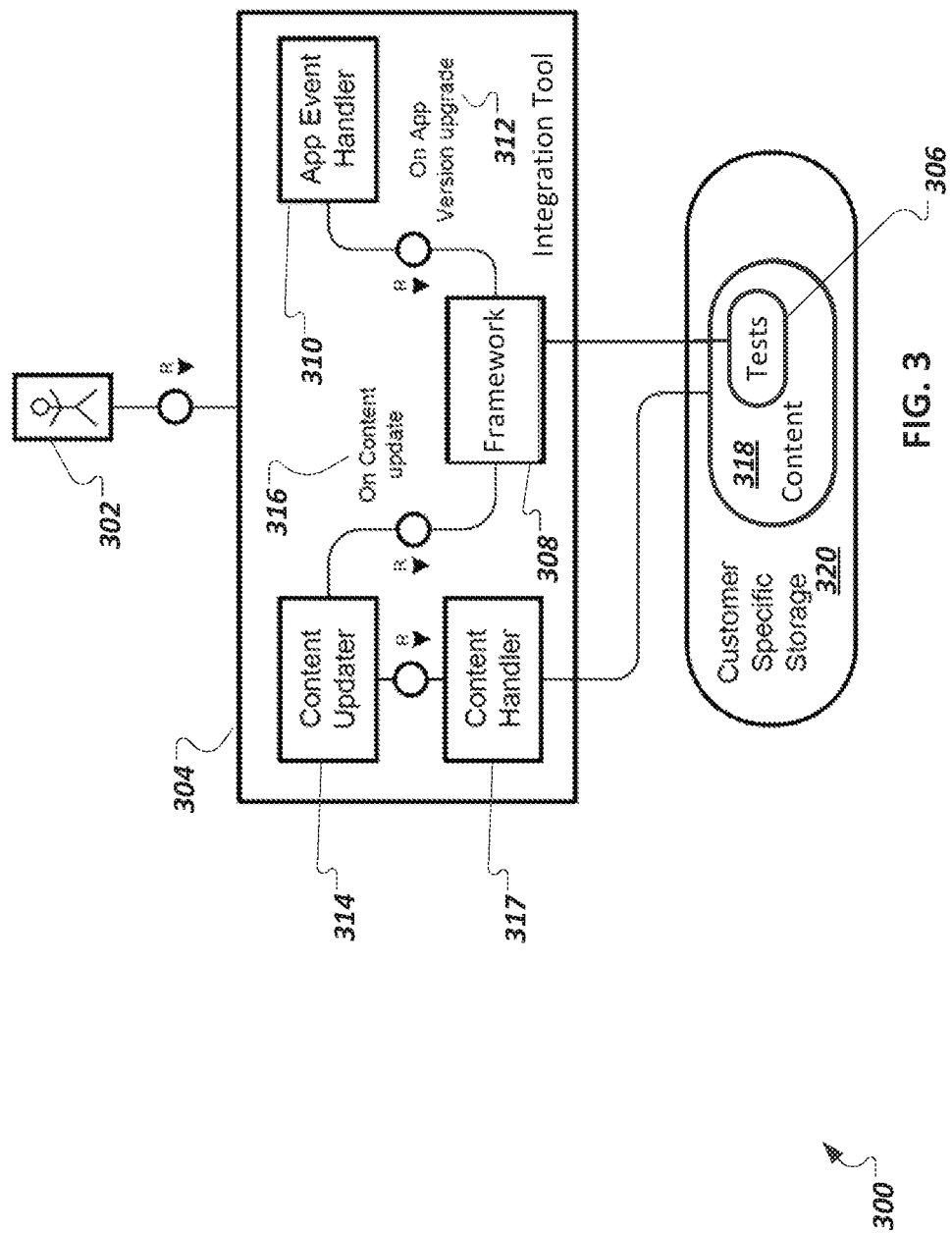

EXECUTING INTEGRATION SCENARIO REGRESSION TESTS IN CUSTOMER LANDSCAPES

CLAIM OF PRIORITY

This application claims priority under 35 USC § 120 to U.S. patent application Ser. No. 16/390,209, filed on Apr. 22, 2019, the entire contents of which are hereby incorporated by reference.

TECHNICAL FIELD

The present disclosure relates to computer-implemented methods, software, and systems for executing integration scenario regression tests in customer landscapes.

BACKGROUND

In an enterprise, a collection of technologies and services forms a middleware framework to enable integration of systems and applications across the enterprise. Integration testing requires information about the end systems such as a source system and a destination system, and list of steps to perform the integration testing. An integration scenario can describe an interaction between a source system and a destination system. Integration testing can include simulating execution of an integration scenario.

SUMMARY

The present disclosure involves systems, software, and computer implemented methods for executing integration scenario regression tests in customer landscapes. One example method includes: identifying a request to create a test case for an integration scenario for a customer of a cloud platform, wherein the integration scenario integrates a first instance, of a first cloud application used by the customer, with a second instance, of a second cloud application used by the customer; creating the test case for the integration scenario, wherein the creating includes enabling the test case to run in an isolated customer environment specific to the customer; identifying an update to the cloud platform; provisionally applying the update to the cloud platform for the customer; executing, in response to identifying the update to the cloud platform, the test case in the isolated customer environment specific to the customer, to test the integration scenario for the customer; determining whether execution of the test case succeeded; in response to determining that the execution of the test case succeeded, finalizing the applied update to the cloud platform for the customer; and in response to determining that the execution of the test case did not succeed, rolling back the applied update to the cloud platform for the customer.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 is a block diagram of an example system enabling integration regression testing in a customer landscape.

DETAILED DESCRIPTION

Figure 1A:
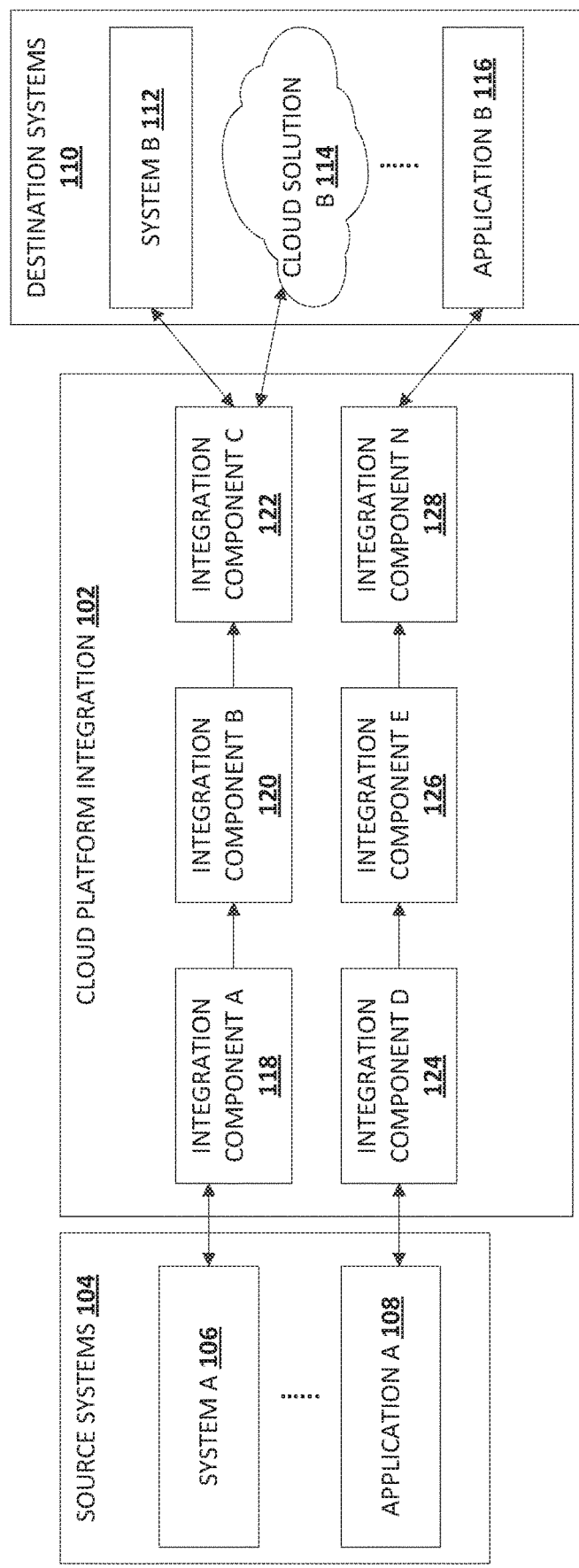
FIGS. 1A and 1B are block diagrams illustrating architectures of an example of a cloud platform integration environment.

A CPI (Cloud Platform Integration) component is a middleware layer that enables development of integration scenarios. An integration scenario can integrate two heterogeneous cloud (or other types of) applications. In some instances, different cloud applications may desire to communicate and send information to other, different cloud applications. Cloud applications may each understand and use different languages, such that a CPI middleware layer can enable communication between different cloud applications. The CPI middleware layer can be configured to perform an integration scenario between applications. The integration scenario can define steps to perform to transform data from a first language used by a first application to a second language used by a second application, for example. The CPI middleware layer can also perform other transformations, to put data from the first application in a form that is usable by the second application. In summary, the CPI middleware layer can integrate otherwise incompatible applications.

The CPI middleware layer can encapsulate intelligence for transforming data between different languages. Transformation logic can be contained within the CPI middleware layer instead of being scattered among various applications. Accordingly, each application does not need to have logic for transforming data to languages used by various other applications. The CPI middleware layer can accordingly reduce maintenance costs. For instance, the first application may desire to also or instead talk to a third application that knows a third language. Rather than having the first application have logic for transforming data in the first language to both data in the second language and data in the third language, such transformation logic can be included in the CPI middleware layer.

Additionally, transformation logic can be reused within the CPI middleware layer. For instance, a fourth application may understand the first language and may want to talk to the third application. Logic for transforming data between the first language and the third language can be used by a first integration scenario for integrating the first and second applications, and by a second integration scenario for integrating the fourth application and the third application. As another example, the fourth application may desire to talk to yet another application, e.g., a fifth application, that understands a language that has already been handled by the CPI middleware layer. For instance, existing logic in the CPI middleware layer for transforming data from the first language to the second language can be reused.

A systems provider that provides the CPI middleware layer can also provide a large number of applications to customers, with each application providing, for example, a different type of enterprise functionality. Typical customers of the systems provider may tend to use many, if not all of the applications provided by the systems provider. Having each customer develop integration content for integrating the various systems provider applications would be redundant and inefficient. The systems provider has significant experience and domain knowledge regarding each application and integration between different applications.

Content development teams at the systems provider can use acquired domain knowledge to generate integration content for integrating different applications. The systems provider can make that integration content available to customers. For instance, customers can subscribe to an integration application and can browse for available integration content for integrating different applications. Customers can select integration content and deploy that content, rather than performing costly custom development of integration content. Customers can configure and otherwise adjust downloaded integration content to suit specific scenarios. When a new version of an application, or a new application, is available, integration content developers can develop integration content for enabling that application to integrate with other applications. Customers can then download and use the new integration content.

As described in more detail below, integration content developers may be on separate teams from developers of the CPI middleware layer. The CPI development team may have some understanding of how the integration content is being or will be used. However, the CPI development team may not know exactly what payloads are going to be sent or exactly what scenarios will be used. When an update to the CPI middleware layer is deployed, regression errors can occur. If a customer installs a new version of the CPI middleware layer, and a problem occurs, the customer may not be able to perform integration scenarios.

Additionally, integration content development teams may frequently provide increments to particular integration content, and such increments can break customers' integration scenarios that use that content. For example, previously-used payloads that worked with older versions of the CPI middleware layer and the provided integration content may no longer work with newer versions. Accordingly, customer dissatisfaction and frustration can occur.

The CPI development team faces challenges in that the CPI development team may not know exactly how the integration content developers have developed new integration content and the CPI development team may also not know exactly what runtime content customers will use in integration scenarios. The CPI development team generally doesn't know, in advance, exact application integration usage of the CPI tool that will be used at runtime after deployment of a new or updated tool, or after updated integration content has been installed (e.g., since a customer may modify published content).

Although a customer may provide some template content for testing, customers may be unwilling (or unable) to provide full content and sample test payloads for testing, for security, legal, and/or practical reasons. Due to challenges in having actual and adequate data for performing exhaustive testing, the CPI development team may face challenges in avoiding regression errors when an updated integration tool and/or updated integration content is released. As mentioned, regression errors are undesirable and generally have negative effects for the customer, the CPI development team, and integration content developers. Live scenario execution can be blocked until a patch is applied. Deploying updates, without regression, is desirable, since customers may desire new features in the CPI development tool, and integration content developers and customers generally desire to have updated integration content deployed when new content has been developed for any given pair of applications.

To avoid problems from regression errors caused by inadequate testing, an integration flow unit framework within the CPI middleware layer can enable customers to create test cases within the customer's landscape. Accordingly, customers do not need to transmit test cases or test data to the cloud platform. The integration flow unit framework enables customers to create test cases within the CPI integration application and the CPI integration application itself validates the customer's test cases, upon a new version (of the CPI tool or integration content) migration. Using local customer test data, simulations of application data sending and application data receiving can be performed, e.g., simulating the actual integration scenario, using the local customer data.

Customer test cases for regression testing can be defined when the customer tests the customer's scenarios in the customer's environment. Accordingly, test case payloads are customer specific. Customers can store any particular test payload without worrying that it may be accessible, viewable, or comingled with other customers' data. The integration flow unit framework provides customer data isolation, with privacy safeguarding of customer data and scenarios. The CPI tool can store customer-specific content in a database schema isolated to particular customer tenants.

When there is a software update to the integration tool, the test cases within the customer landscape can be executed, before finalizing the update for the customer, to ensure that the update will not adversely affect the customer's integration scenarios. If a problem occurs during execution of the test case, the customer can be reverted to a prior version of the software. Additionally, alerts can be sent to the CPI development team and/or the integration content development team(s), notifying of test case failure with the software release. The customer can remain active, performing integration scenarios, and can avoid regression issues.

The CPI component can also provide metrics that can be used by the customer to understand the quality of test content. Metrics can include how much of a scenario is covered by a set of test cases and how many test cases are maintained for the customer, which can be useful for quantifying test content. Another benefit of the integration flow unit framework is that, over a period of time, CPI developers can be able to identify components of the CPI component that are highly vulnerable (e.g., prone to potential errors, due to error history). Knowing which components of the CPI layer may be vulnerable to changes can help the CPI and integration content developers with better planning of software and content increments. Additionally, another benefit of the CPI layer is that partner contents can be supported, where any cloud platform partner can be allowed to publish content which customers can consume. The integration flow unit framework can be useful for testing partner provided content, in customer landscapes, with an option for rollback if an issue is discovered. The integration flow unit framework can provide, for a customer, a protection layer against problematic content and software upgrades. A customer can have control over a set of test cases to be used for the customer—the customer can add additional test cases, such as test cases to test for previously discovered issues with updated content or software (e.g., to avoid regression errors).

FIG. 1A is a block diagram illustrating an architecture of an example of a cloud platform integration environment 100. Cloud platform integration can support end-to-end integration processes across cloud-based and on-premise applications. Cloud platform integration can seamlessly integrate heterogeneous applications and systems. A cloud platform integration component 102 integrates source systems 104, such as a system A 106, an application A 108, etc., with destination systems 110, such as a system B 112, a cloud solution B 114, an application B 116, etc. The cloud platform integration component 102 that can be configured between the source systems 104 and the destination systems 110 can also be referred to as middleware. As an example, the system A 106 may be an on-premise system, the application A 108 may be an enterprise resource planning (ERP) system or cloud solution, the system B 112 may be a customer relationship management (CRM) system, the cloud solution B 114 may be an enterprise cloud solution, the application B 116 may be an enterprise application, etc. The source systems 104 and the destination systems 110 may be a combination of specialized/proprietary hardware and proprietary software with custom processing speed and memory.

An integration process between the source systems 104 and the destination systems 110 is stored in an artifact named an integration flow or integration scenario. An integration flow defines how a message is processed between the source systems 104 and the destination systems 110. Integration flows can be used to specify integration patterns referred to as mapping or routing between source systems 104 and destination systems 110. An integration flow between the source systems 104 and the destination systems 110 can be stored in a file format such as extensible markup language (XML). Cloud platform integration can include various integration components. Various integration components such as integration component A 118, integration component B 120, integration component C 122, integration component D 124, integration component E 126, and integration component N 128 are available in the cloud platform integration 102 as middleware, for example. An individual integration component may perform a specific function and, in some cases, may invoke additional scripts or program logic to perform the specific function. In some scenarios, there may be multiple integration components in the cloud platform integration 102.

Figure 1B:
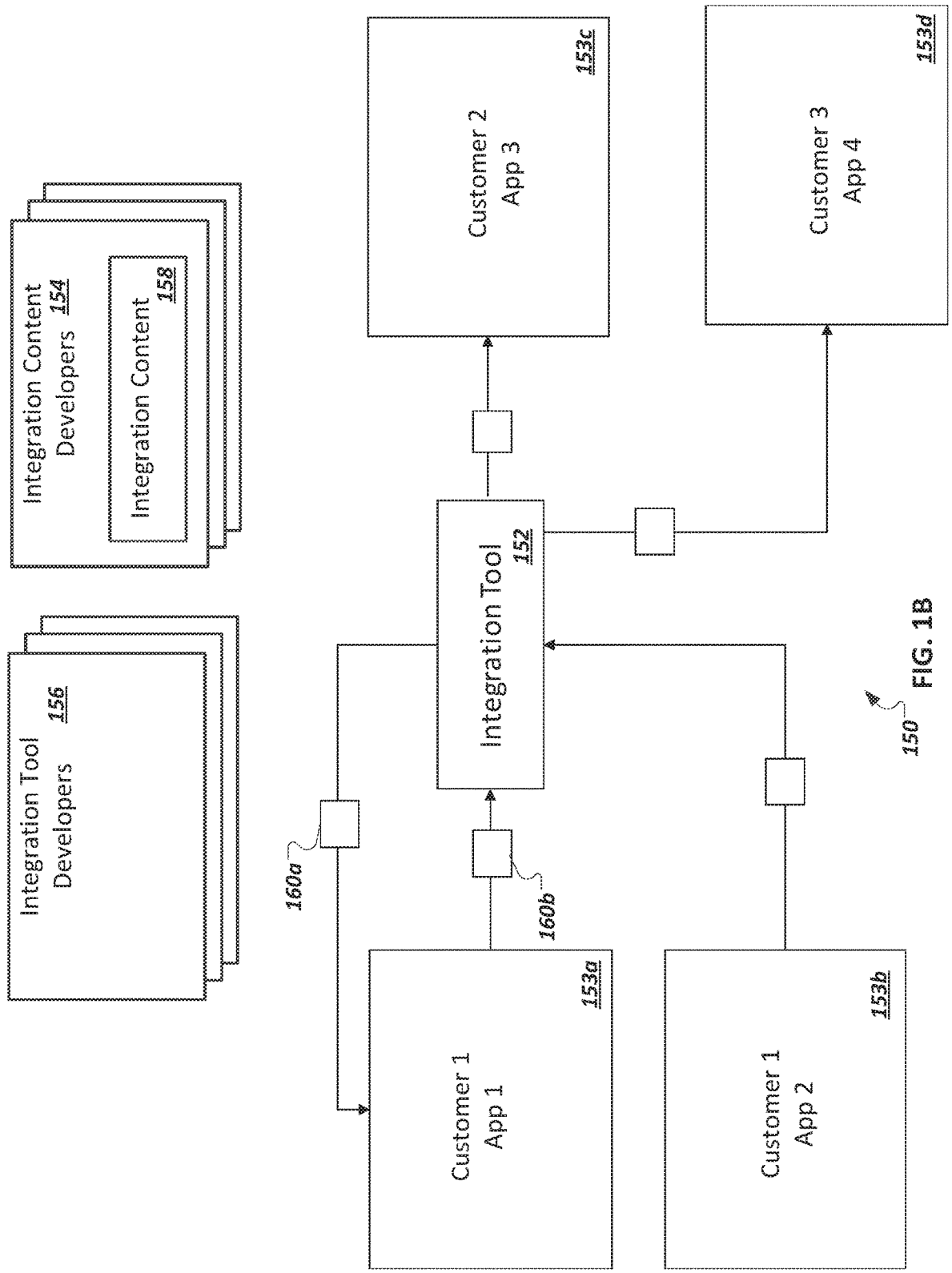

FIG. 1B is a block diagram illustrating an architecture of an example of a cloud platform integration environment 150. An integration tool 152, for example, a cloud application, acts as a single platform that can be used by integration content developers 154 and customers. For example, "customer 1" uses the integration tool 152 to integrate a first application 153a and a second application 153b with other application(s), "customer 2" uses the integration tool 152 to integrate a third application 153c with other application(s), and "customer 3" uses the integration tool 152 to integrate a fourth application 153d with other application(s).

The integration tool 152 is developed by integration tool developers 156. The integration tool developers 156 can continue to develop and publish features of the integration tool 152 on a regular (e.g., monthly, weekly, or event-driven) basis. Regular updates to the integration tool 152 can enable fulfillment of customer and content development needs in a timely fashion.

The integration tool 152 enables integration content developers 154 to develop integration content 158 and integration scenarios as end-to-end application integration solutions and publish the developed integration scenarios and integration content to a public catalog accessible by customers. A strength of a systems (e.g., cloud) provider is the integration content 158 internally developed by the integration content developers 154, as the internal integration content developers 154 have domain knowledge of various cloud and other applications provided by the systems provider, and can therefore create useful integration content for integrating any given pair of applications. The integration content developers 154 can include multiple teams of integration content developers, with each team having a particular domain or application expertise. Integration content development teams can regular develop and provide integration content, including new and updated content.

The integration tool 152 can, for example, provide functionality for providing increments or patches for already-shipped integration content. Accordingly, customers can receive timely updates. For instance, an update to integration content 160a and/or 160b that is used by the first application 153a can be published by the integration tool 152 and acquired by "customer 1". In some implementations, "customer 1" may modify the integration content 160a or 160b to tailor the published content to custom modifications that have been made to customer versions of the first application 153b. Customers can also use the integration tool 152 to develop custom integration content for integrating, for example, with third party applications.

As mentioned, the integration tool developers 156 can develop and deploy updates to the integration tool 152. Updates to the integration tool 152 can be provided in conjunction with or separately from updates to the integration content 158. The integration tool developers 156 can communicate with customers if problems occur with updates to the integration tool 152 and/or the integration content 158. As discussed in more detail below, regression errors can be detected before updates are finalized, by enabling test cases to run in customer landscapes, rather than at the systems provider.

Figure 2:
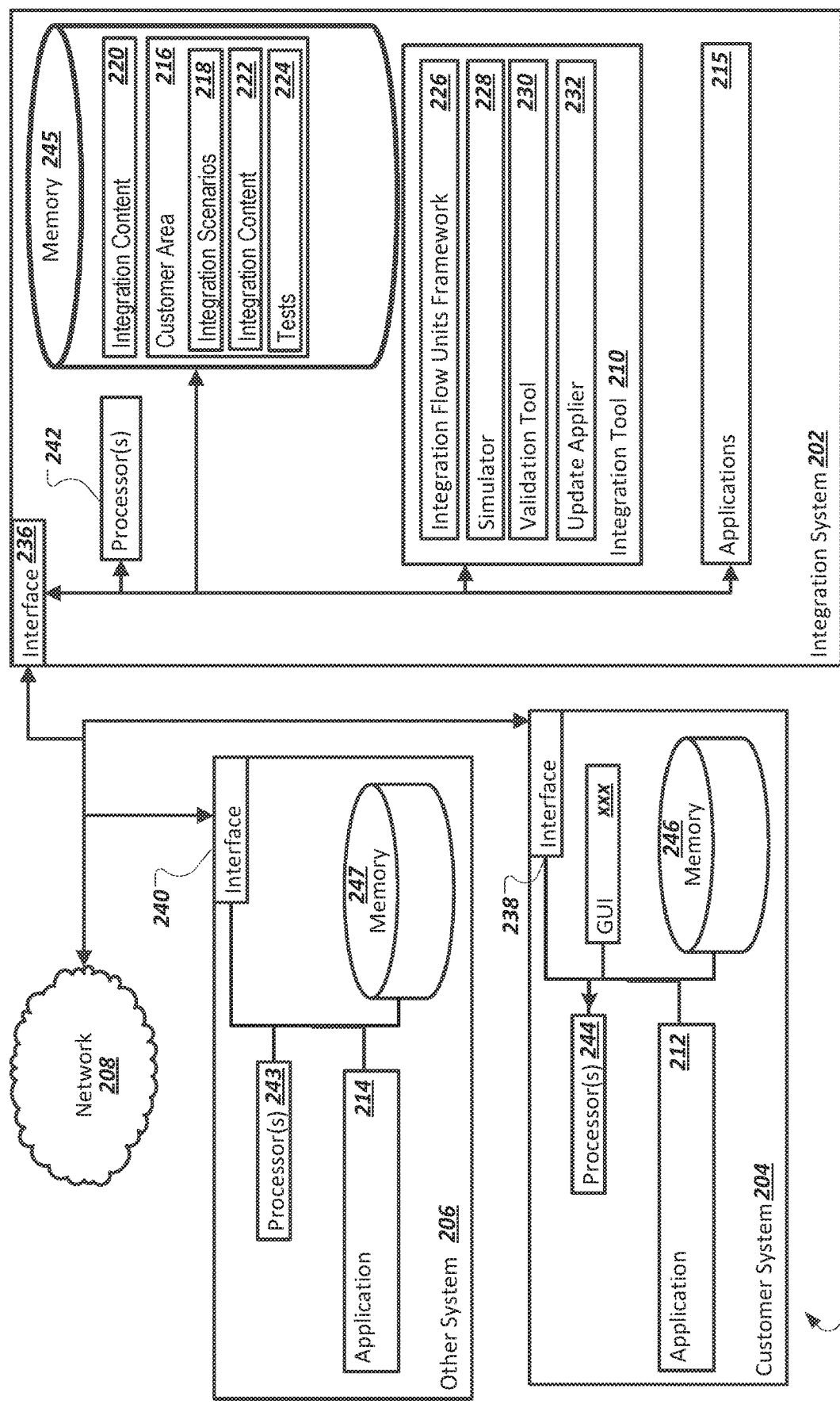
FIG. 2 is a block diagram illustrating an example system for executing integration scenario regression tests in customer landscapes.

FIG. 2 is a block diagram illustrating an example system 200 for executing integration scenario regression tests in customer landscapes. Specifically, the illustrated system 200 includes or is communicably coupled with an integration system 202, a customer system 204, an other system 206, and a network 208. Although shown separately, in some implementations, functionality of two or more systems or servers may be provided by a single system or server. In some implementations, the functionality of one illustrated system or server may be provided by multiple systems or servers.

A customer associated with the customer system 204 can use an integration tool 210 provided by the integration system 202 to integrate, for example, an application 212 of the customer with an application 214 running on the other system 206. In some implementations, the other system 206 is associated with the customer. In other implementations, the other system 206 is associated with another entity other than the customer. Although shown as running on another system, the application 214 can run on the customer system 206 (and the integration tool 210 can be used to integrate different applications on the same customer system 206). The applications 212 and 214 can each be client-side versions or instances of one of server/cloud applications 215 provided, for example, by a systems provider associated with the integration system 202. For instance, the server/ cloud applications 215 can be provided by one or more cloud platforms (which may be separate systems from the integration system 102).

Data for the customer can be stored at the integration system 202 in a customer area 216. Although one customer area 216 is illustrated, a separate customer area can be maintained for each customer. For instance, integration scenario definition(s) can be stored for the customer in an integration scenarios area 218. An integration scenario definition includes information about the end (e.g., source, target) systems involved in an integration scenario and a list of steps to be performed on a payload by the source and/or target system. An integration scenario can use published integration content 220 that has been defined, for example, by integration content developers. For some or all integration scenarios for a customer, integration content can be at least partially specific for the customer (e.g., custom integration content 222). For example, the customer can create integration content and/or can modify a customer-specific copy of the published integration content 220.

Tests 224 can be created for a customer to test the customer's integration scenarios. The tests 224 for the customer can be configured to act on data in the customer area 216 (and not on data for other customers). Tests 224 can be created for a customer when an integration scenario is executed for a customer. For example, an integration flow unit framework 226 can, while the integration tool executes an integration scenario, intelligently collect payload information being used in the integration scenario and add the payload information to corresponding tests 224, for later use in test execution. An integration scenario simulator 228 can be used when executing tests for purposes of test case creation. Simulation of cloud platform integration testing can provide a customer with a simulated environment to simulate scenario execution without having to actually use live hardware systems as source and destination systems. For instance, in an exemplary scenario, an enterprise resource planning (ERP) system used as a source system may be integrated with a destination system such as a banking system for monthly salary disbursement for employees. The integration of the ERP system to the banking system may be through various integration components such as national electronic funds transfer (NEFT), etc. It may not be practically possible to test such an integration scenario by transferring, for example, actual salary information for employees by integrating the live ERP system and the live banking system. In some cases, the ERP system and the banking system may be a combination of specialized hardware and software systems with specialized processors. Simulation of cloud platform integration testing enables simulating and testing the monthly salary disbursement for employees without live/production systems. Simulation of cloud platform integration testing may be performed in milliseconds or microseconds in comparison to manually trying to test the integration components which may take a few days/hours, or trying to configure a physical replica of live systems for a test.

A customer can initiate test creation and/or the integration tool 210 can automatically create the tests 224. For instance, the integration tool 210 can, behind the scenes, create a test suite for every integration scenario and add the test cases to associated customer areas. A lifetime of test cases can be bound to associated integration scenarios. For instance, when an integration scenario is deleted, associated test cases can be automatically deleted as well.

Once the tests 224 are created for a customer, a given test can be executed to test an integration scenario. A test can be executed, for example, on demand by customer request. As another example, a program or system can make API (Application Programming Interface) calls to the integration flow unit framework 226 for bulk execution of tests. As yet another example, tests can be executed in response to an event. For instance, tests can be automatically executed in response to an update to the integration content 220 or 222 or to the integration tool 210 itself.

Although a validation tool 230 can be used to perform certain tests internally within the integration system 202 before an update is made available to a customer, regression errors can occur, as described above. In addition to testing that may be performed by the validation tool 230, the tests 224 for the customer can be executed, using data within the customer area 216, to ensure that the update won't adversely affect the customer.

An update applier 232 can provisionally apply (e.g., without committing) the update for the customer and use, for example, the integration scenario simulator 228 to execute the tests. If the tests 224 are successful, the update can be committed for the customer. If any errors or inconsistencies occur when executing the tests 224 for the customer, the update applier 232 can roll back the update(s). Accordingly, an incompatible change caused by an update can be presented from reaching the customer's production system. Accordingly, live integration scenarios can remain active for the customer, while issues with the tests 224 are investigated.

As used in the present disclosure, the term "computer" is intended to encompass any suitable processing device. For example, although FIG. 2 illustrates a single integration system 202, a single customer system 204, a single other system 206, the system 200 can be implemented using two or more of each type of system. Indeed, the integration system 202, the customer system 204, and the other system 206 may be or include any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the integration system 202, the customer system 204, and the other system 206 may be adapted to include execution of any operating system, including Linux, UNIX, Windows, Mac OS®, Java™, Android™, iOS or any other suitable operating system.

Interfaces 236, 238, and 240 are used by the integration system 202, the customer system 204, and the other system 206, respectively, for communicating with other systems in a distributed environment—including within the system 200—connected to the network 208. Generally, the interfaces 236, 238, and 240 each comprise logic encoded in software and/or hardware in a suitable combination and operable to communicate with the network 208. More specifically, the interfaces 236, 238, and 240 may each comprise software supporting one or more communication protocols associated with communications such that the network 208 or interface's hardware is operable to communicate physical signals within and outside of the illustrated system 200.

The integration platform 202, the customer system 204, and the other system 206 respectively include one or more processors 242, 243, or 244. Each of the processor(s) 242, 243, and 244 may be a central processing unit (CPU), a blade, an application specific integrated circuit (ASIC), a field-programmable gate array (FPGA), or another suitable component. Generally, each processor 242, 243, or 244 executes instructions and manipulates data to perform the operations of a respective corresponding system. Each processor 242 executes the functionality required to receive and respond to requests from the customer system 204 or from the other system 206, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 2 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The integration platform 202, the customer system 204, and the other system 206 respectively include memory 245, 246, or 247. In some implementations, the integration platform 202, the customer system 204, and/or the other system 206 include multiple memories. Each of the memory 245, 246, and 247 may include any type of memory or database module and may take the form of volatile and/or non-volatile memory including, without limitation, magnetic media, optical media, random access memory (RAM), read-only memory (ROM), removable media, or any other suitable local or remote memory component. Each of the memory 245, 246, or 247 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of a respective corresponding system.

The customer system 204 and the other system 206 may generally be or include any computing device operable to connect to or communicate with the integration platform 202 via the network 208 using a wireline or wireless connection. In general, the customer system 204 and the other system 206 can include at least one electronic computer device operable to receive, transmit, process, and store any appropriate data associated with the system 200 of FIG. 2. The customer system 204 and the other system 206 can include one or more client applications, including the application 212 or the application 214, respectively. A customer application is any type of application that allows the customer system 204 or the other system 206 to request integration services from the integration system 202 or to receive integration requests from the integration system 202.

The customer system 204 and the other system 206 can generally be or include any computing device such as a laptop/notebook computer, wireless data port, smart phone, personal data assistant (PDA), tablet computing device, one or more processors within these devices, or any other suitable processing device. For example, the customer system 204 and the other system 206 may include a computer that includes an input device, such as a keypad, touch screen, or other device that can accept user information, and an output device that conveys information associated with the operation of the integration server 202, or the respective system itself, including digital data, visual information, or a GUI (Graphical User Interface).

For instance, a GUI 250 of the customer system 204 interfaces with at least a portion of the system 200 for any suitable purpose, including generating a visual representation of the application 212. In particular, the GUI 250 may be used to view and navigate various Web pages. Generally, the GUI 250 provides the user with an efficient and user-friendly presentation of business data provided by or communicated within the system. The GUI 250 may comprise a plurality of customizable frames or views having interactive fields, pull-down lists, and buttons operated by the user. The GUI 250 contemplates any suitable graphical user interface, such as a combination of a generic web browser, intelligent engine, and command line interface (CLI) that processes information and efficiently presents the results to the user visually.

There may be any number of customer systems 204 associated with, or external to, the system 200. For example, while the illustrated system 200 includes one customer system 204, alternative implementations of the system 200 may include multiple customer systems 204 communicably coupled to the integration platform 202 and/or the network 208, or any other number suitable to the purposes of the system 200. Additionally, there may also be one or more additional customer systems 204 external to the illustrated portion of system 200 that are capable of interacting with the system 200 via the network 208. Further, the terms "customer", "client", "client device" and "user" may be used interchangeably as appropriate without departing from the scope of this disclosure. Moreover, while the customer system 204 is described in terms of being used by a single user, this disclosure contemplates that many users may use one computer, or that one user may use multiple computers.

FIG. 3 is a block diagram of an example system 300 for enabling integration regression testing in a customer landscape. A user 302 can trigger various changes that may affect an integration tool 304. For instance, the user 302 may be an integration tool developer who may initiate deployment of an upgrade (e.g., new version) of the integration tool 304. As another example, the user 302 may be an integration content developer who publishes new integration content.

A change related to the integration tool 304 can trigger automatic execution of customer-specific tests 306 by an integration flow unit framework 308. For instance, an application event handler 310 can send an on-application-version-upgrade message 312 to the integration flow unit framework 308. As another example, a content updater 314 can send an on-content-update message 316 to the integration flow unit framework 308, in response to new integration content being deployed for a particular customer by a content handler 317 (e.g., in a content area 318 of customer-specific storage 320). The customer may have received an automatic update of integration content, may have downloaded content, or may have used the integration tool 304 to create custom content (e.g., based on previously-downloaded content), for example.

In response to a particular trigger (e.g., integration tool or integration content update), the integration flow unit framework 308 can automatically execute the tests 306, in an isolated manner, using customer-specific content and customer-specific tests, with the test execution not affecting other customers. If any of the tests 306 fail, a respective application upgrade or content upgrade can be reverted for that particular customer, so that the customer can continue to execute integration scenarios (e.g., with a prior integration tool version or a prior version of integration content).

Figure 4B:
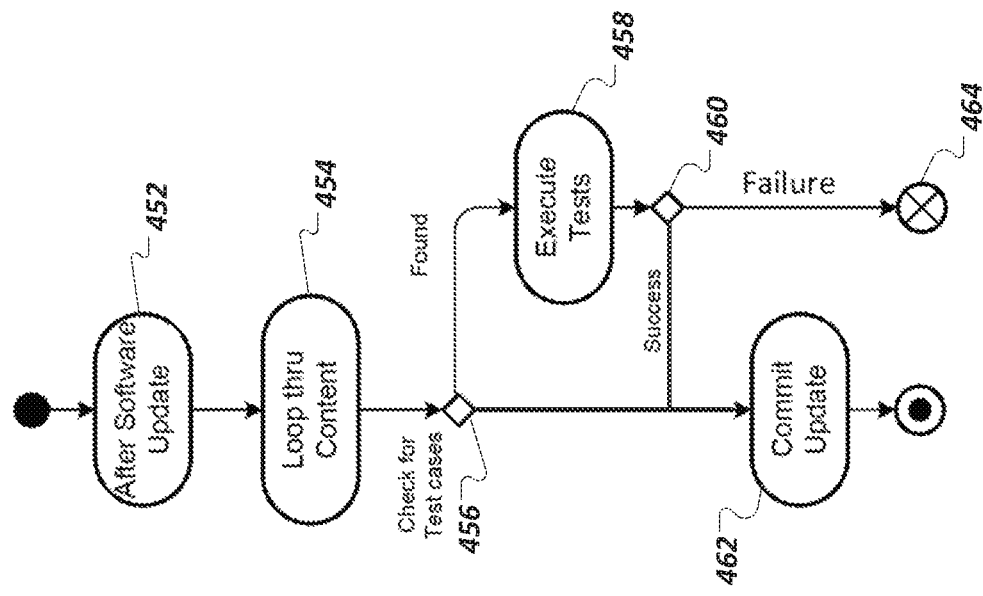
FIG. 4B is a flowchart of an example method for executing tests in response to a software update.
Figure 4A:
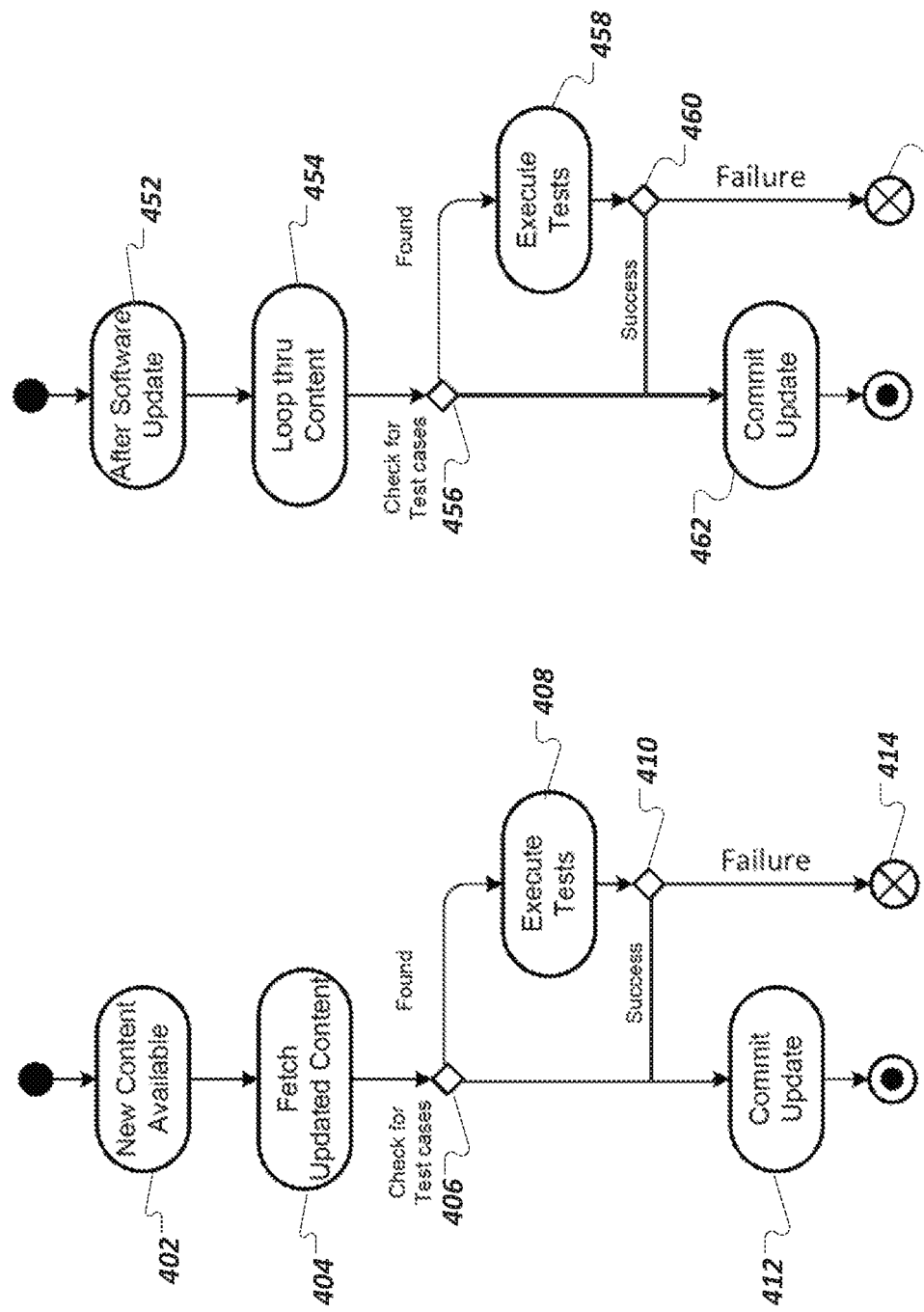
FIG. 4A is a flowchart of an example method for executing tests in response to a content update.

FIG. 4A is a flowchart of an example method 400 for executing tests in response to a content update. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the integration system 200 described above with respect to FIG. 2. For example, the method 400 and related methods can be executed by the integration system 202 of FIG. 2.

At 402, a notification is received that new or updated content is available. For example, an integration content developer can send a notification to an integration tool that updated content is available. As another example, a scheduled content update tool that runs periodically (e.g., weekly) can send a notification that updated content is available (if in fact, updated content is now available since a last scheduled update).

At 404, the updated content is fetched, retrieved, or received.

At 406, a determination is made as to whether test cases associated with the type of updated content are available.

At 408, if associated test cases have been identified, the identified test cases are executed for a particular customer.

At 410, a determination is made as to whether execution of the tests was successful.

At 412, if the tests were successful, the content update is finalized.

At 414, if the tests were not successful, the content update is not finalized. In some implementations, at least portions of a content update are reverted, if any update activities using the updated content were performed for the customer. In some implementations, the process 400 is repeated for multiple customers, with different test cases being retrieved and executed for each customer. In some implementations, if no test cases are found for the content update (e.g., at step 406), the content update is finalized (e.g., at 412).

FIG. 4B is a flowchart of an example method 450 for executing tests in response to a software update. It will be understood that method 450 and related methods may be performed, for example, by any suitable system, environment, software, and hardware, or a combination of systems, environments, software, and hardware, as appropriate. For example, one or more of a client, a server, or other computing device can be used to execute method 450 and related methods and obtain any data from the memory of a client, the server, or the other computing device. In some implementations, the method 450 and related methods are executed by one or more components of the integration system 200 described above with respect to FIG. 2. For example, the method 450 and related methods can be executed by the integration system 202 of FIG. 2.

At 452, a notification is received that updated content is available.

At 454, different sets of content are retrieved. For instance, each item of updated content is retrieved.

At 456, a determination is made as to whether test cases associated with the type of retrieved content are available. For instance, a particular customer may have an existing set of test cases that are associated with the retrieved content.

At 458, if associated test cases have been identified, the identified test cases are executed for the particular customer. The test cases can be executed as a preview of using the updated content.

At 460, a determination is made as to whether execution of the tests was successful. In some implementations, a measure of success can be that an acceptable number of updates (e.g., to parameters of application programs) may be required to successfully use the updated content in the future. In some implementations, the measure of success is whether test cases each returned a successful result.

At 462, if the tests were successful, the software update is finalized for the customer.

At 464, if the tests were not successful, the software update is not finalized for the customer. In some implementations, at least portions of a software update are reverted, if any software update activities using the updated software were performed for the customer. In some implementations, the process 450 is repeated for multiple customers, with different test cases being retrieved and executed for each customer. In some implementations, if no test cases are found for the software update (e.g., at step 456), the content update is finalized (e.g., at 462).

Figure 5A:
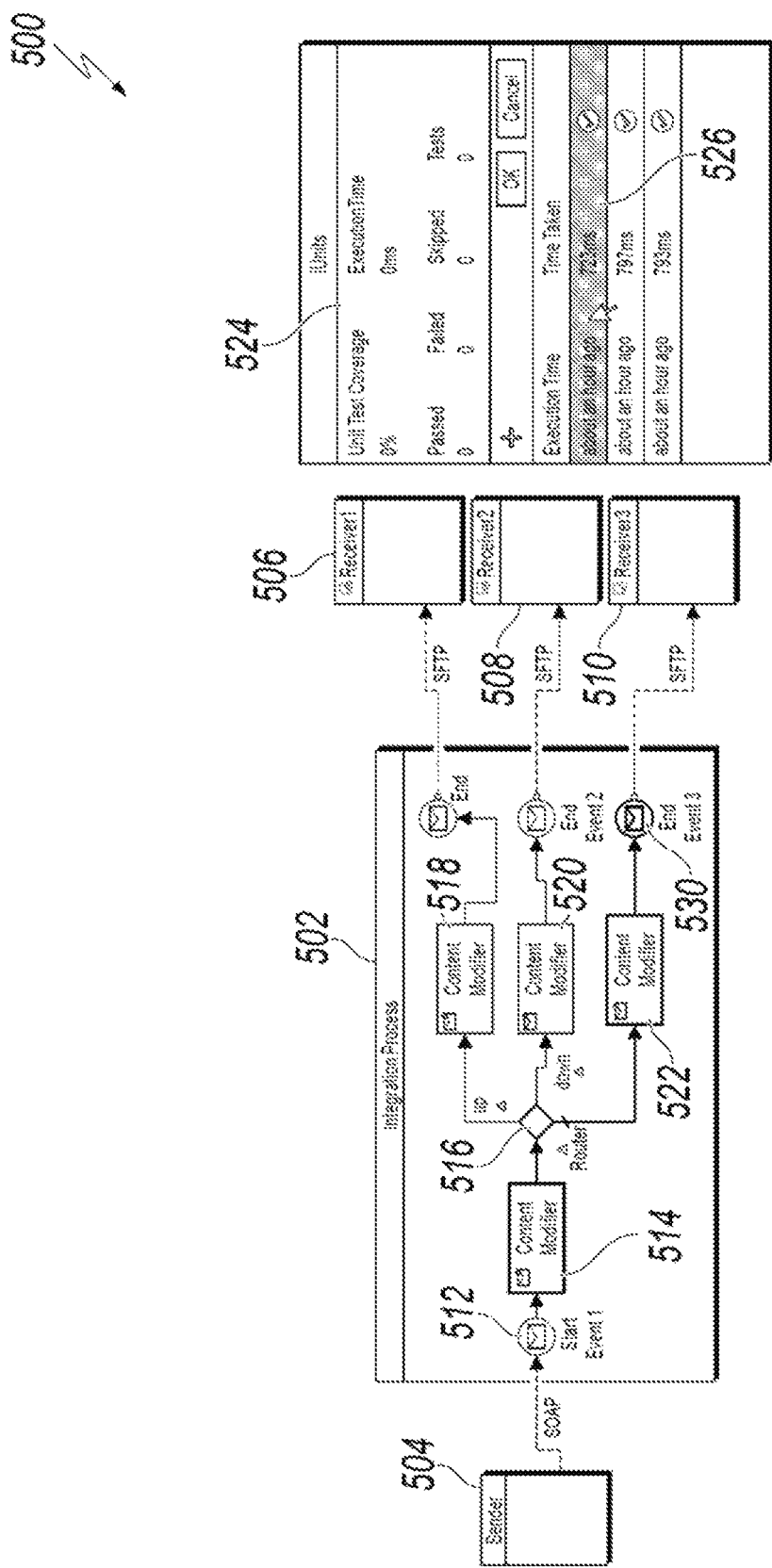
FIG. 5A-5E are example user interfaces illustrating example integration flows.

FIG. 5A illustrates an example integration flow 502 in an example user interface 500. The integration flow 502 documents message passing between a sender 504 and receivers 506, 508, and 510. The integration flow 502 includes a start event 512 that represents the receiving of an initial message from the sender 504. A content modifier 514 may modify the initial message and may send the modified message to a router 516, which routes the modified message to one of a content modifier 518, a content modifier 520, or a content modifier 522.

In an iUnits (Integration Flow Units) panel 524, a user can select a test case result 526, which represents a particular path of the integration flow 502. For instance, in response to selection of the test case result 526, a path 528 that includes the sender 504, the start event 512, the content modifier 514, the router 516, the content modifier 522, an end event 530, and the receiver 510, can be highlighted. The path 528 represents components of the integration flow 502 that have been tested with a test case corresponding to the test case result 526.

Figure 5B:
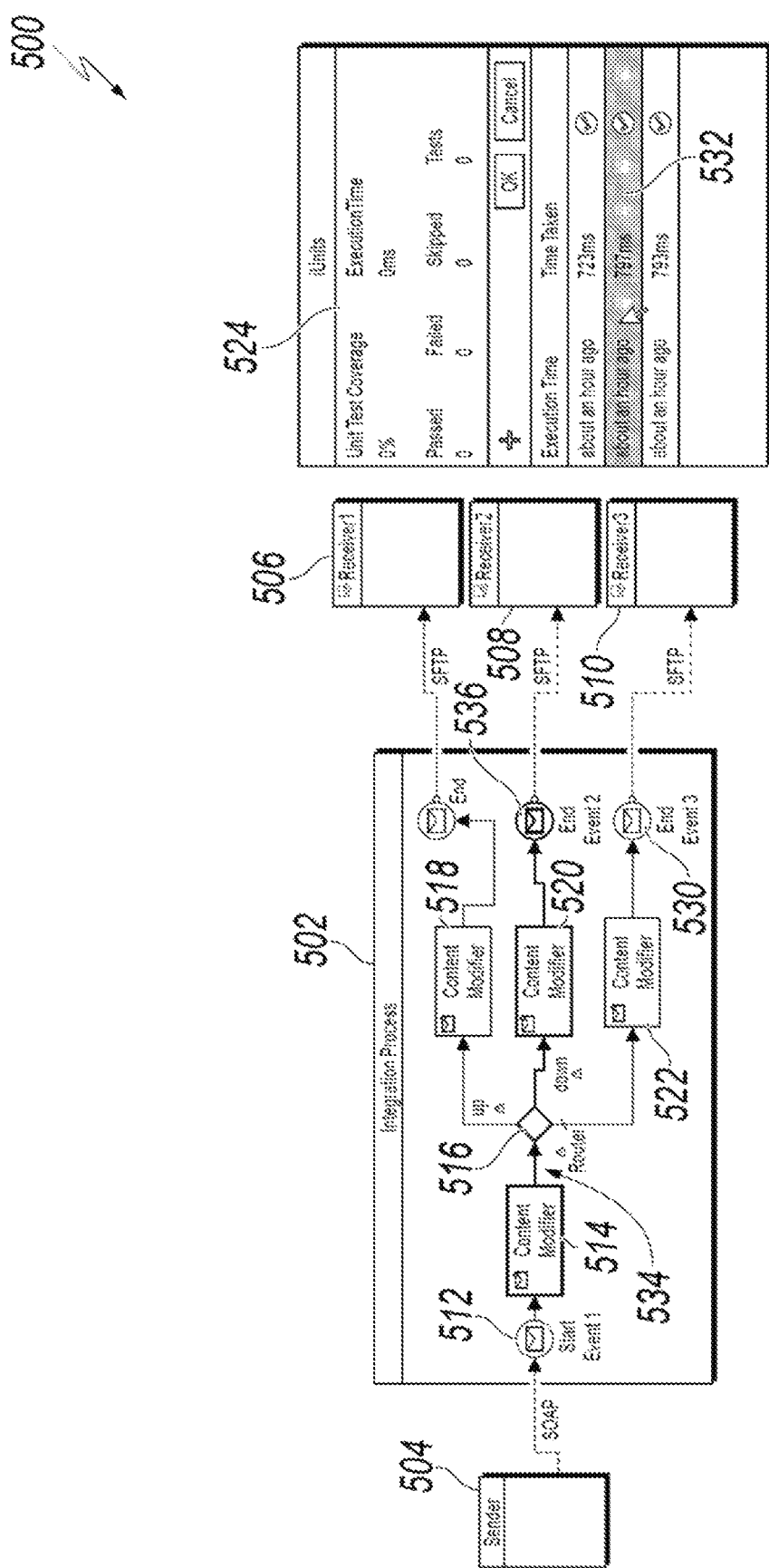

As another example and as shown in FIG. 5B, a user can select a test case result 532, which represents another path of the integration flow 502. For instance, in response to selection of the test case result 532, a path 534 that includes the sender 504, the start event 512, the content modifier 514, the router 516, the content modifier 520, an end event 536, and the receiver 508, can be highlighted. The path 534 represents components of the integration flow 502 that have been tested with a test case corresponding to the test case result 532.

Figure 5C:
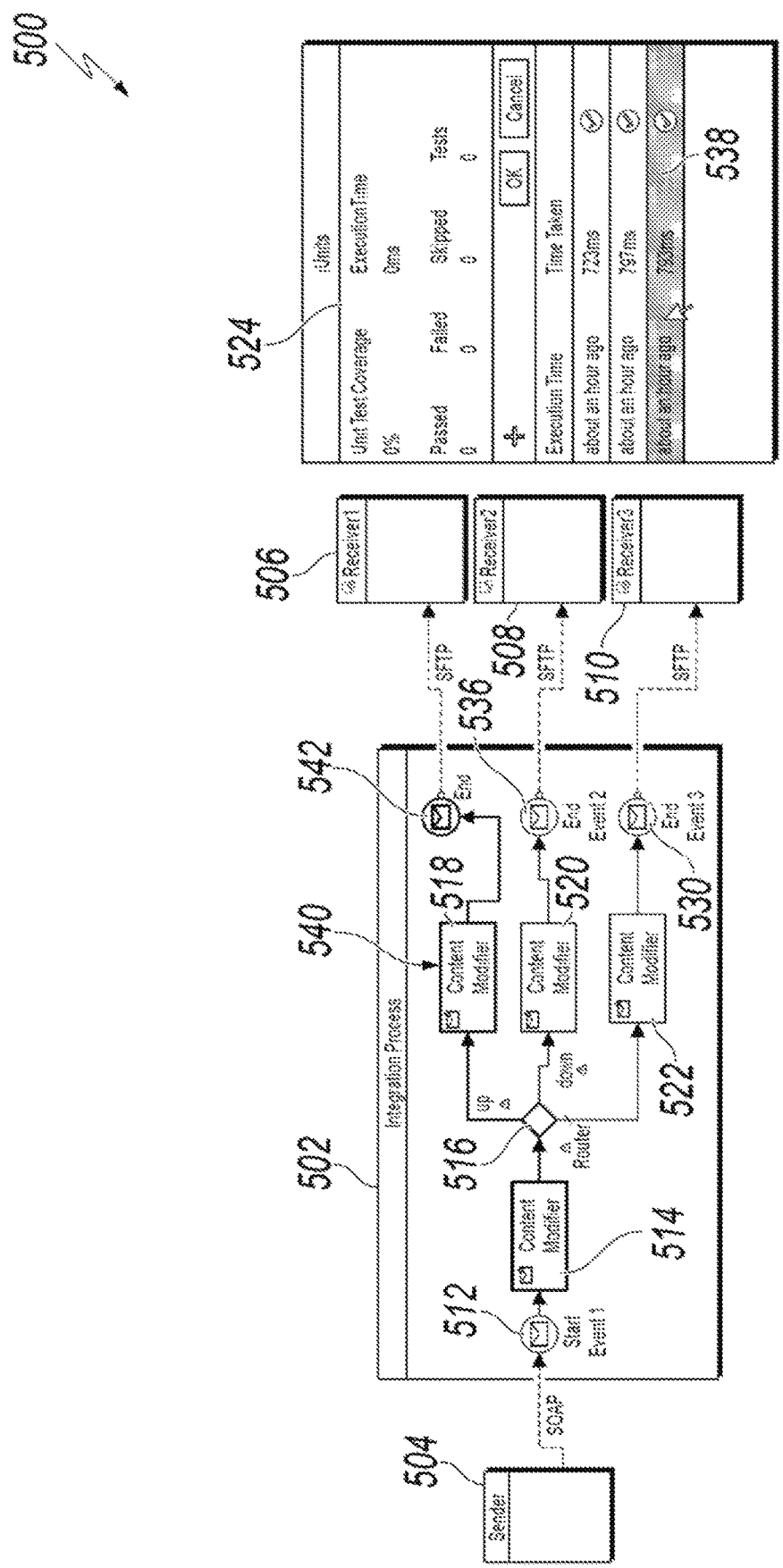

As yet another example and as shown in FIG. 5C, a user can select a test case result 538, which represents another path of the integration flow 502. For instance, in response to selection of the test case result 538, a path 540 that includes the sender 504, the start event 512, the content modifier 514, the router 516, the content modifier 518, an end event 542, and the receiver 506, can be highlighted. The path 540 represents components of the integration flow 502 that have been tested with a test case corresponding to the test case result 538.

Figure 5D:
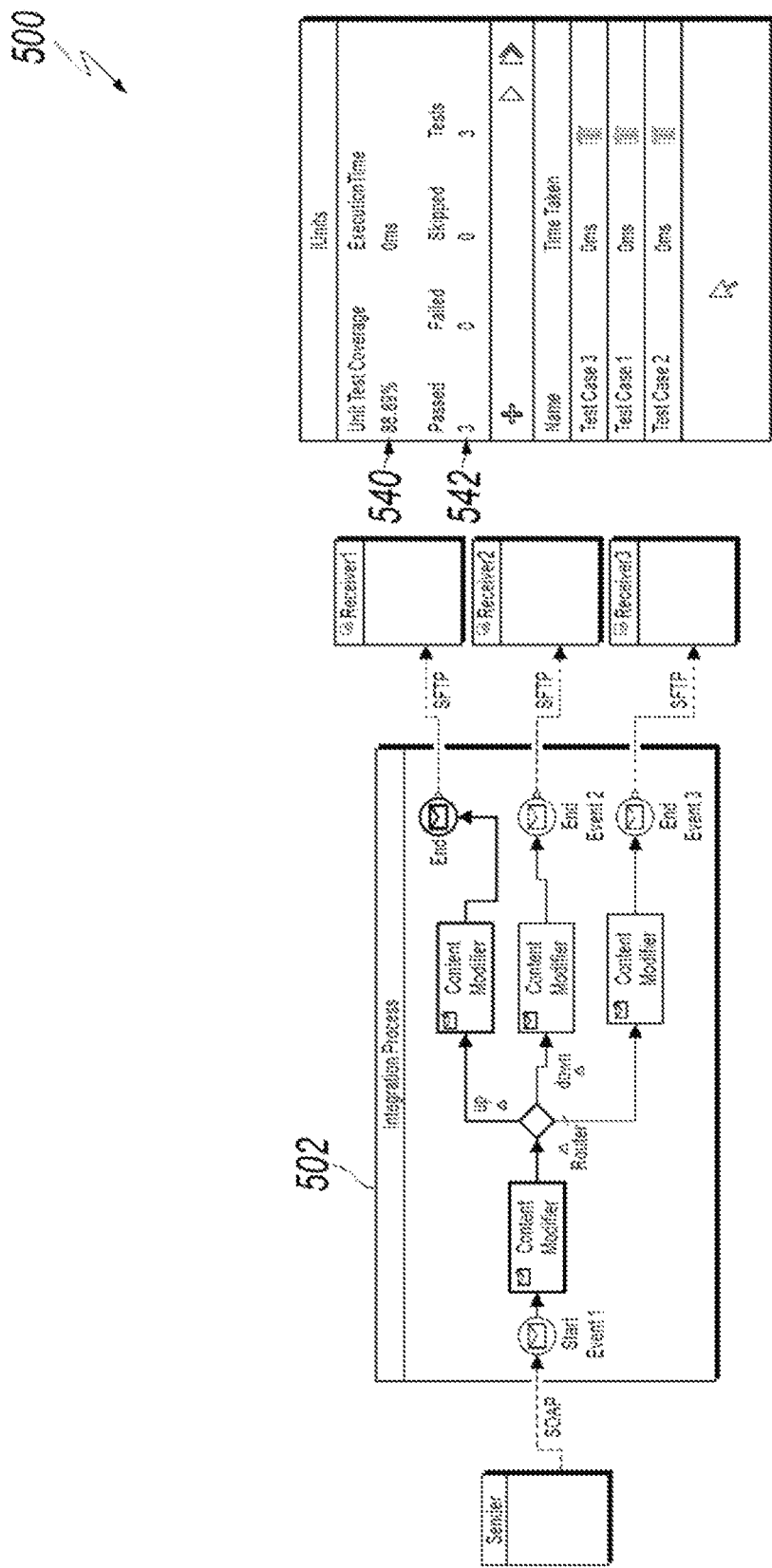

As shown in FIG. 5D, the three test cases that have been added for the integration flow 502 provide a test coverage amount of 88.9% 544. A latest test result summary 546 indicates that all three tests have passed.

Figure 5E:
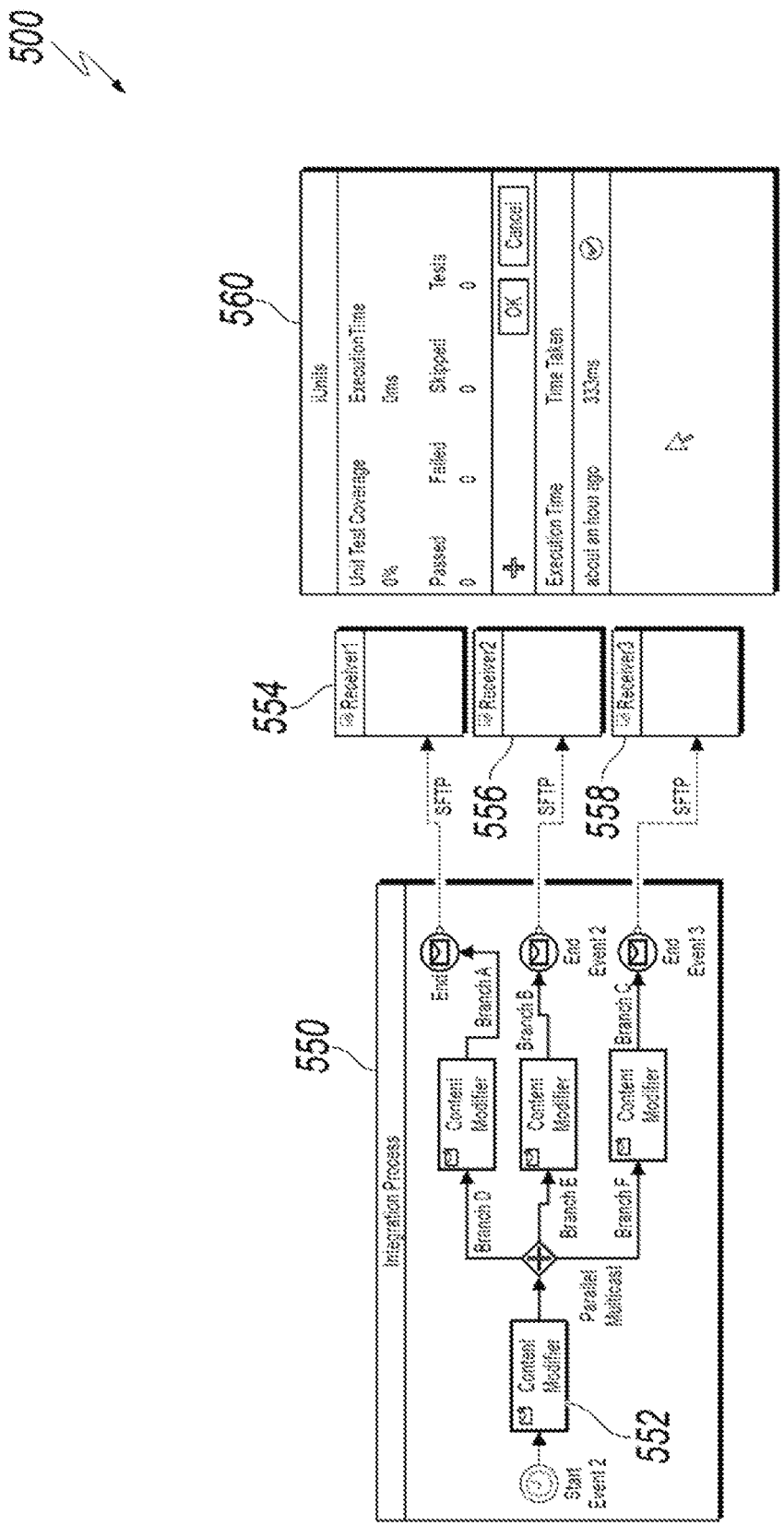

As shown in FIG. 5E, other types of integration flows can be tested. For instance, an integration flow 550 is a multicast flow in which a message sent from a sender 552 is received by each of a receiver 554, a receiver 556, and a receiver 558. An iUnits panel 560 can be used to add tests for the integration flow 550, as described above.

Figure 6:
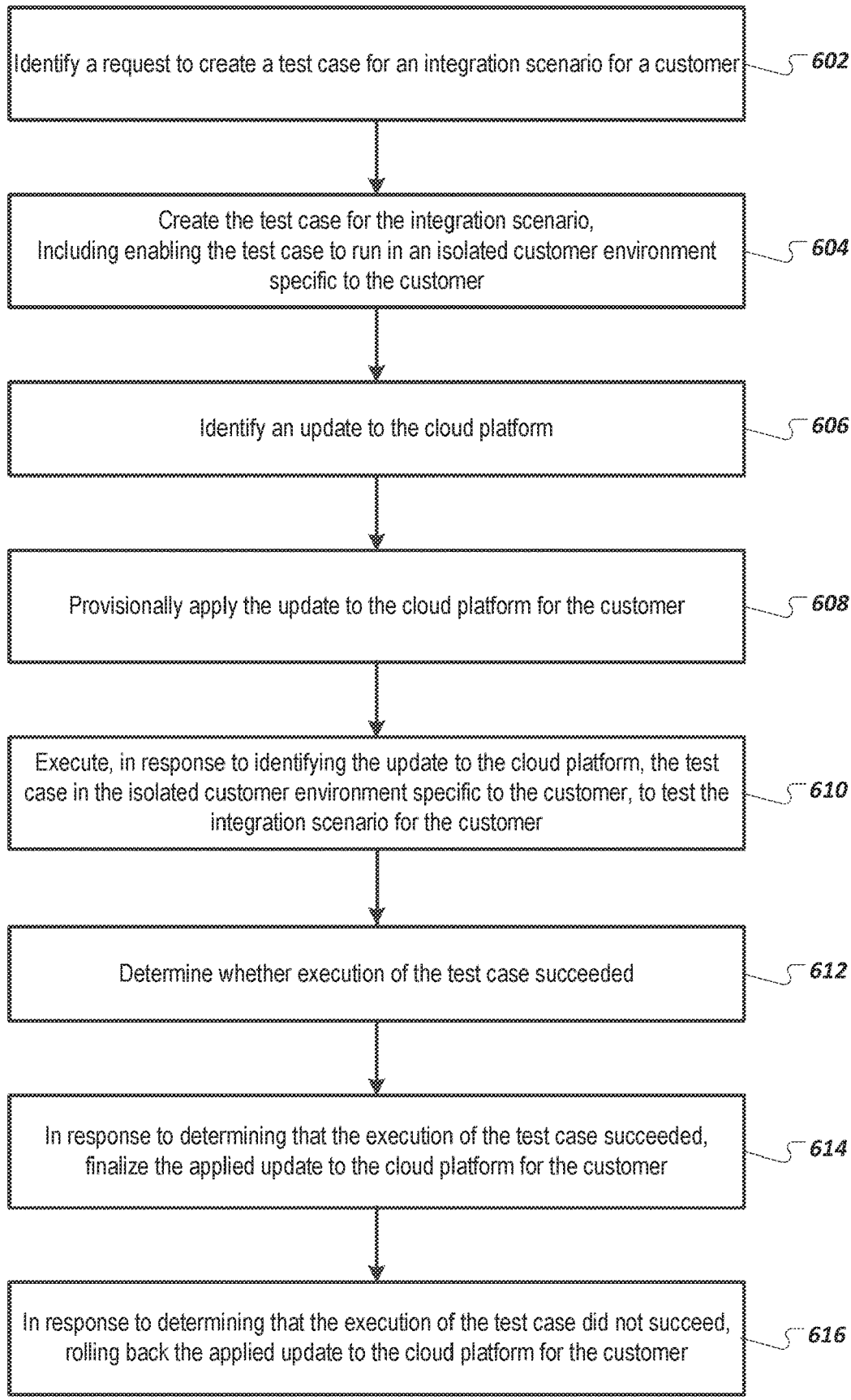
FIG. 6 is a flowchart of an example method for executing integration scenario regression tests in customer landscapes.

FIG. 6 is a flowchart of an example method 600 for executing integration scenario regression tests in customer landscapes. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the integration system 200 described above with respect to FIG. 2. For example, the method 600 and related methods can be executed by the integration system 202 of FIG. 2.

At 602, a request to create a test case for an integration scenario for a customer of a cloud platform is identified. The integration scenario integrates a first instance, of a first cloud application used by the customer, with a second instance, of a second cloud application used by the customer.

At 604, the test case for the integration scenario is created. Creating the test case includes enabling the test case to run in an isolated customer environment specific to the customer. The test case can be created by an integration tool included in the cloud platform. The integration tool can automatically create the test case or can create the test case in response to receiving a request from the customer to create the test case.

At 606, an update to the cloud platform is identified. The update can be a software update to an integration tool. The update can be an update is a content update to integration content used by the integration tool. The content update can be an integration content update published by integration content developers associated with the cloud platform. The content update can be a modification, by the customer, of the integration content update published by the integration content developers.

At 608, the update is provisionally applied to the cloud platform for the customer.

At 610, the test case is executed in the isolated customer environment specific to the customer, to test the integration scenario for the customer, in response to identifying the update to the cloud platform. The integration tool can use a simulator to simulate execution of the integration scenario.

At 612, a determination is made as to whether execution of the test case succeeded.

At 614, in response to determining that the execution of the test case succeeded, the applied update to the cloud platform is finalized for the customer.

At 616, in response to determining that the execution of the test case did not succeed, the applied update to the cloud platform is rolled back for the customer.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
identifying a request to create a test case for an integration scenario for a customer of a cloud platform, wherein the integration scenario integrates a first instance of a first cloud application used by the customer with a second instance of a second cloud application used by the customer;
creating the test case for the integration scenario, wherein the creating includes enabling the test case to run in an isolated customer environment specific to the customer;
applying an update to a cloud platform for the customer;
executing, in response to a trigger, the test case in the isolated customer environment specific to the customer, to test the integration scenario for the customer;
determining whether execution of the test case succeeded; and
in response to determining that the execution of the test case did not succeed, rolling back the applied update to the cloud platform for the customer.

2. The method of claim 1, further comprising:
identifying an update to the cloud platform; and
provisionally applying the update to the cloud platform for the customer.

3. The method of claim 2, wherein the trigger comprises the update to the cloud platform.

4. The method of claim 2, wherein the update is a software update to an integration tool included in the cloud platform.

5. The method of claim 4, wherein the update is a content update to integration content used by the integration tool.

6. The method of claim 5, wherein the content update is an integration content update published by integration content developers associated with the cloud platform.

7. The method of claim 6, wherein the content update is a modification, by the customer, of the integration content update published by the integration content developers.

8. The method of claim 1, wherein the test case is created by the integration tool.

9. The method of claim 1, wherein the integration tool automatically creates the test case.

10. The method of claim 1, wherein the integration tool creates the test case in response to receiving a request from the customer to create the test case.

11. The method of claim 1, wherein the integration tool uses a simulator to simulate execution of the integration scenario.

12. The method of claim 1, further comprising:
receiving a request, by the customer, to execute the test case; and
executing the test case, in response to the received request.

13. A system comprising:
one or more computers; and a computer-readable medium coupled to the one or more computers having instructions stored thereon which, when executed by the one or more computers, cause the one or more computers to perform operations comprising:
identifying a request to create a test case for an integration scenario for a customer of a cloud platform, wherein the integration scenario integrates a first instance of a first cloud application used by the customer with a second instance of a second cloud application used by the customer;
creating the test case for the integration scenario, wherein the creating includes enabling the test case to run in an isolated customer environment specific to the customer;
applying an update to a cloud platform for the customer;
executing, in response to a trigger, the test case in the isolated customer environment specific to the customer, to test the integration scenario for the customer;
determining whether execution of the test case succeeded; and
in response to determining that the execution of the test case did not succeed, rolling back the applied update to the cloud platform for the customer.

14. The system of claim 13, wherein the operations further comprise:
identifying an update to the cloud platform; and
provisionally applying the update to the cloud platform for the customer.

15. The system of claim 14, wherein the trigger comprises the update to the cloud platform.

16. The system of claim 14, wherein the update is a software update to an integration tool included in the cloud platform.

17. A computer program product encoded on a non-transitory storage medium, the product comprising non-transitory, computer readable instructions for causing one or more processors to perform operations comprising:
identifying a request to create a test case for an integration scenario for a customer of a cloud platform, wherein the integration scenario integrates a first instance of a first cloud application used by the customer with a second instance of a second cloud application used by the customer;
creating the test case for the integration scenario, wherein the creating includes enabling the test case to run in an isolated customer environment specific to the customer;
applying an update to a cloud platform for the customer;
executing, in response to a trigger, the test case in the isolated customer environment specific to the customer, to test the integration scenario for the customer;
determining whether execution of the test case succeeded; and
in response to determining that the execution of the test case did not succeed, rolling back the applied update to the cloud platform for the customer.

18. The computer program product of claim 17, wherein the operations further comprise:
identifying an update to the cloud platform; and
provisionally applying the update to the cloud platform for the customer.

19. The computer program product of claim 17, wherein the trigger comprises the update to the cloud platform.

20. The computer program product of claim 19, wherein the update is a software update to an integration tool included in the cloud platform.

* * * * *